(12) United States Patent
Wenfeng et al.

(10) Patent No.: US 8,579,568 B2
(45) Date of Patent: Nov. 12, 2013

(54) SEAT COVER ASSEMBLY

(75) Inventors: Tang Wenfeng, Guangdong (CN); Xia Dihua, Guangdong (CN)

(73) Assignee: Kohler (China) Investment Co., Ltd., Shanghai (CN)

(*) Notice: Subject to any disclaimer, the term of this patent is extended or adjusted under 35 U.S.C. 154(b) by 248 days.

(21) Appl. No.: 13/189,294

(22) Filed: Jul. 22, 2011

(65) Prior Publication Data

US 2012/0042502 A1 Feb. 23, 2012

(51) Int. Cl.
*F16B 13/06* (2006.01)

(52) U.S. Cl.
USPC ............................ 411/58; 411/57.1; 411/60.1

(58) Field of Classification Search
USPC ........... 411/32, 33, 44, 45, 55, 57.1, 58, 60.1, 411/63, 70, 80.1, 80.2, 80.5
See application file for complete search history.

(56) References Cited

U.S. PATENT DOCUMENTS

| | | | |
|---|---|---|---|
| 641,118 A * | 1/1900 | Kelly | 74/551.4 |
| 1,168,770 A * | 1/1916 | Wagner | 411/80.1 |
| 4,579,492 A * | 4/1986 | Kazino et al. | 411/80.1 |
| 4,772,166 A * | 9/1988 | Shamah et al. | 411/32 |
| 4,861,197 A * | 8/1989 | Calandra, Jr. | 405/259.3 |
| 5,193,957 A * | 3/1993 | Fischer | 411/55 |
| 5,501,551 A * | 3/1996 | Wright | 405/259.4 |
| 6,065,918 A * | 5/2000 | Adams | 411/29 |
| 6,676,348 B2 * | 1/2004 | Hoppe | 411/48 |
| 6,712,544 B2 * | 3/2004 | Kruger et al. | 403/408.1 |
| 7,357,613 B2 * | 4/2008 | Houck et al. | 411/60.3 |

* cited by examiner

*Primary Examiner* — Roberta Delisle
(74) *Attorney, Agent, or Firm* — Foley & Lardner LLP

(57) ABSTRACT

An exemplary embodiment relates to an expansion bolt component that includes a bolt, an elastic component, and a nut. The bolt includes a necking part at an upper end thereof. The elastic component includes sides parts that include a plurality of ribs symmetrically arranged. Each rib includes a lower part and an upper part, each lower part being connected to a lower part of an associated adjacent rib. The nut is configured to be threaded onto a lower end of the bolt and to move into a lower end of the elastic component due to rotation of the bolt. The lower part of each rib is configured to expand in a radial direction when the nut moves into the elastic component. The upper part of each rib is configured to move simultaneously toward the upper part of its associated adjacent rib, such that the upper parts of the plurality of ribs clamp the necking part of the bolt.

14 Claims, 3 Drawing Sheets

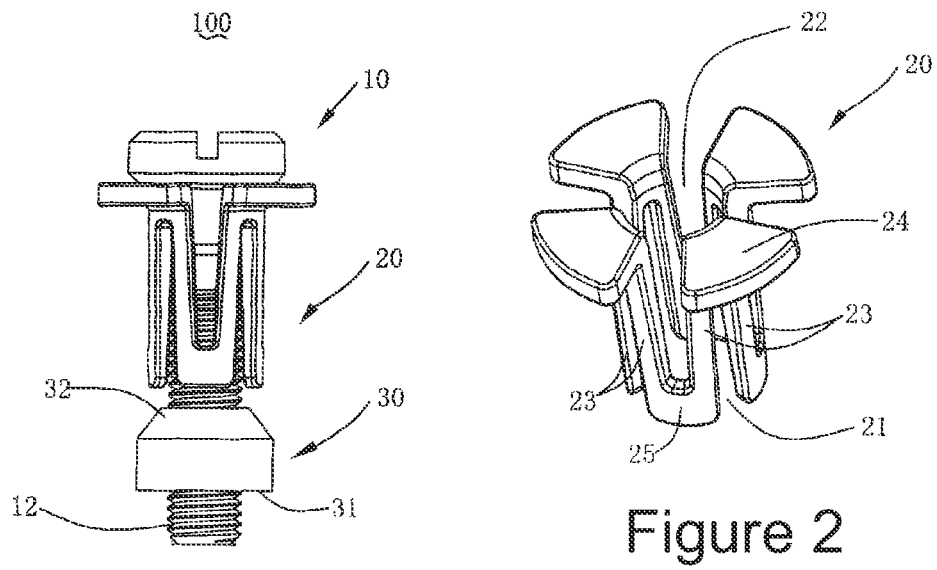
Figure 1
Figure 2
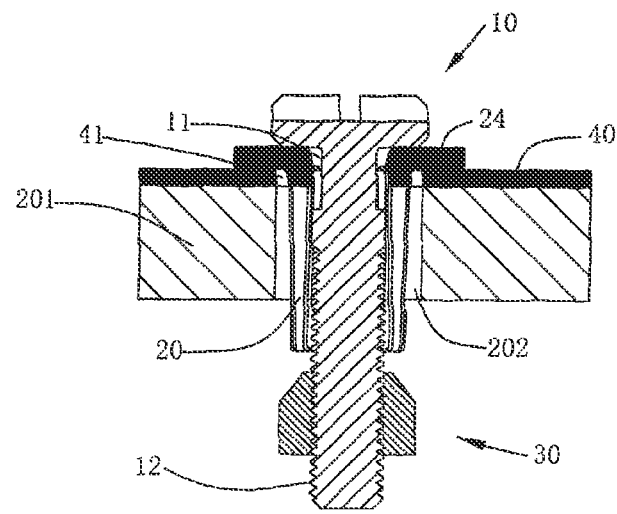
Figure 3

SEAT COVER ASSEMBLY

CROSS-REFERENCE TO RELATED PATENT APPLICATIONS

This application claims the benefit of priority of and is a Continuation-in-Part of China P.R. Priority Application No. 201010236986.4, filed Jul. 26, 2010, the entire disclosure of which is incorporated herein by reference.

BACKGROUND

The present application relates to an expansion bolt component, which is used for fixedly connecting a plate-like object onto another object, such as a ceramic object, glass object, or the like.

Objects often need to be fixedly connected onto another object, such as a ceramic, glass material, or the like. One known method of connecting such objects involves drilling an aperture or opening that includes threads in the surface of the object (conventionally referred to as "tapping" the connection hole) such that a bolt or other fastener may be threaded into the aperture to connect the objects. In cases where the objects to be coupled together are made from a relatively brittle and hard material such as vitreous china, ceramic glass, and the like, manufacturing such connection holes may prove difficult. In particular, it may be difficult to employ such a connection method in conjunction with the manufacture of certain bathroom products, such as a toilet cover plate that needs to be connected on a ceramic toilet.

Means for overcoming the problems in the industry often utilize colloid adhesion of components to be joined. The reliability of such colloid adhesion is relatively low, and adhesive failure is easily caused under various long-term usage conditions. For example, with the toilet product mentioned above, urine is often in contact with the adhesion part and has obvious corrosive impacts on the colloid adhesion.

Another potential method for coupling these types of components together involves the use of a connecting component. For example, a connecting part may be inserted into a mounting hole formed in the ceramic or glass object (e.g., at the rear part of the object). Then, another object is additionally connected. For example, such as with the toilet product mentioned above, various styles of the connecting parts may be provided, which must satisfy the requirement of connecting an object on the upper side of the toilet.

Japanese published examined patent application No. 62-72372 discloses a solution which is commonly used at present. The solution comprises a cylindrical elastic deformation part, a bolt, and a nut. The cylindrical elastic deformation part is inserted into a mounting hole at the rear part of a ceramic toilet. The bolt is inserted into the cylindrical deformation part. In addition to the head part, the whole length of the bolt forms a threaded part. The nut is arranged in the cylindrical elastic deformation part. The nut is in bolted joint with the threaded part of the bolt and can move upwards based on the rotation of the bolt. The nut enables the cylindrical elastic deformation part to expand in the circumferential direction. Furthermore, when the cylindrical elastic deformation part expands in the circumferential direction and is firmly clamped by the nut and the inner wall of the mounting hole of the toilet, the toilet cover positioned on a side of the connecting part may be indirectly fixed to the toilet in a manner for free mounting and dismounting.

Existing structures have a number of deficiencies. For example, most of the cylindrical elastic deformation parts are made of elastic plastic material that corrodes easily during long-term use, which results in damage and degraded performance. Furthermore, the cylindrical elastic deformation parts are very difficult to restore, so that the connecting parts are very difficult to be reused when the cylindrical elastic deformation parts need to be re-mounted, such as if the toilet covers need to be detached for cleaning the upper surfaces of the toilets. Additionally, the bolts have no further constraints to prevent movement in the vertical direction, such that the bolts may easily become loose in the vertical direction. Therefore, the connection of the toilet covers can be very unreliable.

It would thus be advantageous to provide an improved.

SUMMARY

An exemplary embodiment relates to an expansion bolt component that includes a bolt, an elastic component, and a nut. The bolt includes a necking part at an upper end thereof. The elastic component includes sides parts that include a plurality of ribs symmetrically arranged. Each rib includes a lower part and an upper part, each lower part being connected to a lower part of an associated adjacent rib. The nut is configured to be threaded onto a lower end of the bolt and to move into a lower end of the elastic component due to rotation of the bolt. The lower part of each rib is configured to expand in a radial direction when the nut moves into the elastic component. The upper part of each rib is configured to move simultaneously toward the upper part of its associated adjacent rib, such that the upper parts of the plurality of ribs clamp the necking part of the bolt.

Another exemplary embodiment relates to an expansion bolt assembly that includes a bolt, a nut, and an elastic component. The bolt includes a thread portion. The nut is configured to connect tot eh threaded portion of the bolt. The elastic component includes a plurality of generally vertical ribs arranged to define an upper opening and a lower opening. Each rib includes an upper part and a lower part. The bolt is disposed through the upper opening and is configured to move the nut into the lower opening. When the nut is moved into the lower opening, the lower parts of the ribs are configured to move radially outward, and the upper parts of the ribs are configured to move radially inward.

Another exemplary embodiment relates to a method for connecting a first object to the second object. The method includes providing an expansion bolt assembly. The expansion bolt assembly includes a bolt, a nut, and an elastic component. The elastic component includes a plurality of generally vertical ribs interconnected to define an upper opening and a bottom opening. The bolt includes a necking part and a threaded part, the threaded part being configured to connect to the nut. The nut includes a tapered end configured to be moved into the lower opening of the elastic component by the bolt. The method includes inserting the elastic component through a hole in the first object and a hole in the second object. The method also includes inserting the bolt through the openings of the elastic component, such that the necking part is positioned proximate the upper parts of the ribs and the threaded part is positioned proximate the lower parts of the ribs. The method further includes connecting the nut to the bolt proximate the lower opening of the elastic component. The method additionally includes moving the tapered end of the nut into the lower opening of the elastic component with the bolt.

BRIEF DESCRIPTION OF THE DRAWINGS

FIG. 1 is a single-body connection diagram according to an exemplary embodiment of an expansion bolt component.

FIG. 2 is a stereogram of elastic cylinder of the expansion bolt component of the embodiment as shown in FIG. 1.

FIG. 3 is a sectional view of the expansion bolt component of the embodiment as shown in FIG. 1 mounted to a connecting part.

DETAILED DESCRIPTION

Figure 4:
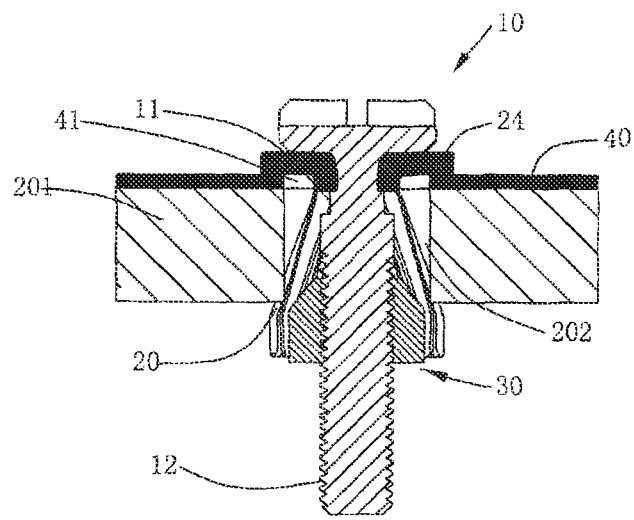
FIG. 4 is a sectional view of the expansion bolt component of the embodiment as shown in FIG. 1 mounted to the connecting part to a maximum extent.

The concepts of the present application aim to overcome the defects in known connection structures and to provide an expansion bolt component, which has a simple structure and universal application, that can provide the corresponding simultaneous constraints on a bolt while closely connecting a connecting part, and may further realize dual-locking between an accessory and the bolt.

According to an exemplary embodiment, an expansion bolt component includes a bolt, an elastic component having a generally cylindrical shape (with portions of the structure of the "cylinder" formed by ribs such that the cylinder does not have completely solid sides; referred to herein for convenience as an elastic cylinder), and a nut. The nut is positioned on a lower side of the elastic cylinder, is in bolted joint with the bolt (i.e., the nut is threaded onto the bolt), and can move to enter into the elastic cylinder due to rotation of the bolt. The bolt further comprises a necking part positioned on an upper side thereof. The side parts of the elastic cylinder comprise a plurality of ribs which are symmetrically arranged. Each rib has a lower part and an upper part. The lower part of each rib is connected to the lower part of a first associated adjacent rib. The lower part of each rib is configured to expand in a radial direction due to extrusion of the nut when the nut enters into the elastic cylinder and continues moving inwards. The upper part of each rib and the upper part its associated first adjacent rib are configured to move towards each other simultaneously so as to enable upper parts of the plurality of the ribs to be clamped with the necking part of the bolt.

Further, the elastic cylinder includes opening parts arranged at the upper and lower parts in which the bolt is inserted into the elastic cylinder in a rotatable manner. The hole diameter of the opening parts at the lower end is slightly smaller than the hole diameter of the opening parts at the upper end.

According to an exemplary embodiment, the lower part of each rib forms a "U" shape with the lower portion of the first associated adjacent rib connected thereto. The upper part of each rib is connected to the upper part of a second associated adjacent rib to form an inverted "U" shape.

Petal-shaped sheets are arranged on the upper parts of the plurality of the ribs, and the petal-shaped sheets are tightened to the middle of the elastic cylinder and clamped at the necking part of the bolt. The upper parts of each rib and its first associated adjacent rib move towards each other along the tangential direction of the elastic cylinder.

According to an exemplary embodiment, the nut comprises a generally tapered small end and a generally cylindrical big end, and the elastic cylinder is made of an elastic metal material.

Compared with known connection structures, the expansion bolt component utilizes the nut, which can move upwards based on the rotation operation of the bolt to expand the ribs of the elastic cylinder in the radial direction. When the elastic cylinder is firmly clamped by the nut and the inner wall of the mounting hole of the toilet, deformation is simultaneously generated above the ribs, which retract inwards for also providing a clamping role to the bolt. In this manner, dual-locking between an accessory and the bolt is realized, such that looseness does not easily occur after assembly. The expansion bolt component is also very easy to take out during disassembly and assembly. Further, the expansion bolt component has other prominent substantive characteristics and significant effects as described below.

As shown in FIGS. 1-3, an expansion bolt component 100 according to an exemplary embodiment comprises a bolt 10 capable of penetrating a connecting part in a rotatable manner, an elastic cylinder 20 matched with the bolt 10, and a nut 30 which is connected to the bolt 10 and positioned on a lower side of the elastic cylinder 20. A necking part 11 and a threaded part 12 are respectively formed on an upper side and a lower side of the bolt 10. The elastic cylinder 20 is connected on a lower side of the head part of the bolt 10 and is made of a sheet-like metal material with elasticity. The diameter of each opening part 21 positioned at the lower end of the elastic cylinder 20 is smaller and slightly reduced inwards, as compared to the hole diameter of each opening part 22 at the upper end of the elastic cylinder 20, which is larger and slightly opened outwards.

Side parts of the elastic cylinder 20 are symmetrically arranged and comprise four groups of ribs 23, which are generally encircled into the shapes of rings and have elasticity. Each group comprises a pair of ribs 23 which are basically connected into the shape of an inverted letter "U" and a pedal-shaped sheet or flange 24 arranged at the top end of the pair of the ribs 23 in the same group. Four petal-shaped sheets 24 are symmetrically arranged to correspond with the four groups of the ribs 23. Adjacent ribs 23 of different groups are mutually connected by a connecting part 25 at the opening part 21 at the lower end of the elastic cylinder 20 to form the shape of the letter "U." For example, each rib has lower part connected to the lower part of a first associated adjacent rib (i.e., to form the "U" shape) and an upper part connected to the upper part of a second associated adjacent rib (i.e., to form the inverted "U" shape of a group or ribs).

The nut 30, which is screwed on the threaded part 12 of the bolt, is fixedly arranged on the lower side of the opening part 21 at the lower end of the elastic cylinder 20. Therefore, the expansion bolt component 100 is an assembly (component) comprising the following parts: the elastic cylinder 20, the bolt 10, and the nut 30, wherein the bolt 10 can be inserted into the elastic cylinder 20 in the rotatable manner. The necking part 11 and the threaded part 12 are respectively formed on the upper side and the lower side of the bolt 10. The nut 30 is arranged on the lower side of the elastic cylinder 20, is in bolted joint with the threaded part 12, and can move upwards based on the rotation the bolt 10 so as to enable the elastic cylinder 20 to expand in a radial direction.

Figure 5:
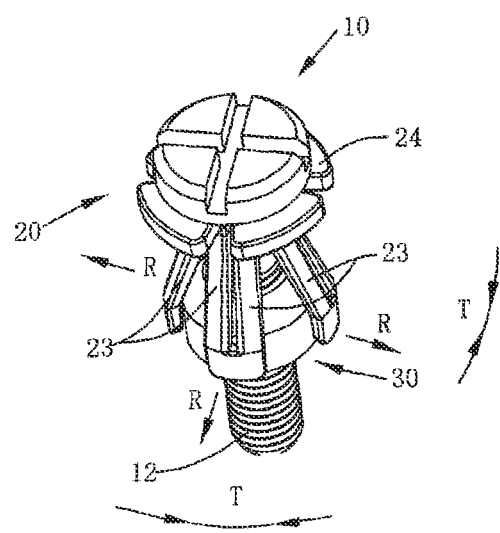
FIG. 5 is a single-body connection diagram of the expansion bolt component of the embodiment as shown in FIG. 1.
Figure 6:
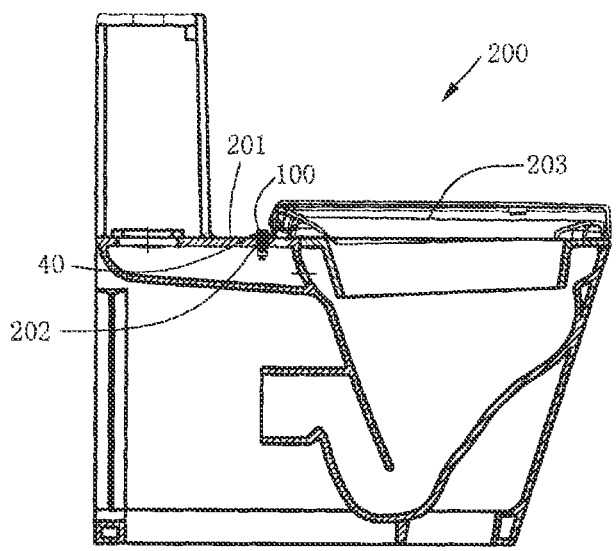
FIG. 6 is a side view of toilet adopting the expansion bolt component of the embodiment as shown in FIG. 1.

As shown in FIGS. 4-6, for the expansion bolt component 100, a connecting plate 40 is fixed on a mounting part made of ceramic and other materials according to the following sequence. Firstly, as shown in FIG. 3, if the elastic cylinder 20 of the expansion bolt component 100 is inserted into a hole 202 of the mounting part 201 of a toilet 200 via the hole 41 of the connecting plate 40, the petal-shaped sheets 24 of the elastic cylinder 20 are engaged with the connecting plate 40, such that the elastic cylinder 20 and the bolt 10 positioned therein hang down from the connecting plate 40. As the bolt 10 rotates in one direction, the threaded part 12 rotates in the same direction. The threaded part 12 is in bolted joint with the nut 30 on the lower side of the opening part 21 at the lower end of the elastic cylinder 20, which is fixed at the upper end part and in the fixed state, such that the nut 30 can rise along the threaded part 12 until the elastic cylinder 20 is clamped with the inner wall of the hole 202 of the mounting part 201 of the toilet 200.

The nut 30 is generally tapered and includes a second (or big or cylindrical) end 31 and a first (or small or tapered) end 32, the second or big end 31 having a diameter that is larger than the diameter of the first or tapered end 32. The big end 31 is generally cylindrical, and its radial size is larger than the size of the opening part 21 at the lower end of the elastic cylinder 20. Preferentially, the radial size of the big end 31 is slightly smaller than the hole diameter size of the hole 202 of the mounting part 201 of the toilet 200 where the elastic cylinder 20 is placed. The small end 32 is tapered, and the radial size of the small end 32 is smaller than the hole diameter of the opening part 21 at the lower end of the elastic cylinder 20 so as to enable the nut 30 to screw into the elastic cylinder 20 through the bolt 10 from the opening part 21. Thus, if the nut 30 on the lower side of the opening part 21 at the lower end of the elastic cylinder 20 rises, each group of the ribs 23 connected into the shape of an inverted letter "U" at the side part of the elastic cylinder 20 will expand in the radial direction R until the nut 30 rises to a limit position. The ribs 23, which are connected into the shape of an inverted letter "U," can expand a considerable amount in the radial direction R, thereby being elastically connected and clamped or pushed and pressed on the inner wall of the hole 202 of the mounting part 201 of the toilet 200. The elastic connection and clamping (pushing and pressing) prevents (e.g., with friction) the elastic cylinder 20 from moving to pull out from the toilet 200, and enables the elastic cylinder 20 and the connecting plate 40 for connecting with a toilet cover 203 to become a whole and be further fixed on the toilet 200.

Further, the nut 30, which can move upwards based on the rotation operation of the bolt 10, is utilized, and one pair of the ribs 23, which are connected into the shape of an inverted letter "U" in each group for constituting the elastic cylinder 20, can expand to the outside in the radial direction R. Furthermore, when the ribs 23 of the elastic cylinder 20, which expand to the outside direction, are firmly clamped by the nut 30 and the inner wall of the hole 202 of the toilet 200, the toilet cover 203 positioned on the side of the expansion bolt component 100 is indirectly fixed on the toilet 200 in a manner being free to mount and dismount. One pair of the ribs 23, which are connected into the shape of an inverted letter "U," can produce a linkage action to the outside in the radial direction R. Simultaneously, one pair of the ribs 23 positioned in the adjacent group and connected into the shape of the letter "U" move towards each other correspondingly along the tangential direction T of the elastic cylinder 20. The petal-shaped sheets 24 at the top are further driven to move to the middle position of the elastic cylinder 20 and are clamped into the necking part 11 of the bolt 10. This provides the functions of reverse buckling and locking, such that the bolt 10 can be also prevented from being pulled out in the axial direction, thereby realizing dual-locking between the connecting plate 40 and the bolt 10.

With this structure, when the toilet cover 203 is detached from the connecting plate 40, the nut 30 can be unscrewed downwards along the threaded part 12 of the bolt 10. By unscrewing the bolt 10 and the nut 30, the bottom parts of the ribs 23 at the side parts of the elastic cylinder 20, which were originally propped open due to extrusion, are restored so as to reduce the diameter of an outer circle of the elastic cylinder 20 and restore the hole diameter, which is smaller than the mounting hole 201. The petal-shaped sheets 24 are simultaneously driven to the outside to loosen the necking part 11 of the bolt 10 from the middle of the elastic cylinder 20 while restoring the bottom parts of the ribs 23. Thereby the bolt is directly taken out and the toilet cover 203 is detached.

It should be understood that the description of the exemplary embodiments of the subject matter of the present application is relatively specific, should only be used as an example, and should not be understood as limiting to the protectable range of the patentable subject matter, such that the protection range recited in the claims shall prevail.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the embodiments shown and described herein are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An expansion bolt component comprising:
   a bolt comprising a necking part at an upper end thereof;
   an elastic component comprising side parts that include a plurality of ribs that are symmetrically arranged, with each rib having a lower part and an upper part, wherein each lower part is connected to a lower part of an associated adjacent rib; and
   a nut configured to be threaded onto a lower end of the bolt and to move into a lower end of the elastic component due to rotation of the bolt;
   wherein the lower part of each rib is configured to expand in a radial direction when the nut moves into the elastic component, and the upper part of each rib is configured to move simultaneously toward the upper part of its associated adjacent rib such that the upper parts of the plurality of ribs clamp the necking part of the bolt.

2. The expansion bolt component of claim 1, wherein:
   the elastic component comprises an upper opening having a first diameter at an upper end of the elastic component and a lower opening having a second diameter at a lower end of the elastic component;
   the second diameter is smaller than the first diameter; and
   the bolt is configured for insertion into the elastic component in a rotatable manner.

3. The expansion bolt component of claim 1, wherein the lower part of each rib forms a "U" shape with the lower portion of the associated adjacent rib connected thereto.

4. The expansion bolt component of claim 1, wherein the upper part of each rib is connect to the upper part of a different adjacent rib to form an inverted "U" shape.

5. The expansion bolt component of claim 1, further comprising petal-shaped sheets arranged on the upper parts of the plurality of the ribs, wherein the petal-shaped sheets are configured to be tightened to the middle of the elastic component and clamped at the necking part of the bolt.

6. The expansion bolt component of claim 1, wherein upper parts of the ribs, which are connected at lower parts, are configured to move towards each other in a tangential direction of the elastic component when the nut moves into the elastic component.

7. The expansion bolt component of claim 1, wherein the nut comprises a first tapered end and a second cylindrical end, wherein the second end has a larger diameter than the first end.

8. The expansion bolt component of claim 1, wherein the elastic component is made of an elastic metal material.

9. An expansion bolt assembly comprising:
   a bolt having a threaded portion;
   a nut configured to connect to the threaded portion of the bolt; and
   an elastic component comprising a plurality of generally vertical ribs arranged to define an upper opening and a lower opening, each rib having an upper part and a lower part;
   wherein the bolt is disposed through the upper opening and is configured to draw the nut into the lower opening; and
   wherein when the nut moves into the lower opening, the lower parts of the ribs are configured to move radially outward, and the upper parts of the ribs are configured to move radially inward.

10. The expansion bolt assembly of claim 9, wherein the upper part of each rib is connected to the upper part of a first adjacent rib, and the lower part of each rib is connected to the lower part of a second adjacent rib.

11. The expansion bolt assembly of claim 10, wherein the elastic component further comprises a plurality of petal-shaped sheets, wherein each petal-shaped sheet is coupled the upper parts of one of the plurality of ribs and its first adjacent rib and extends radially outward.

12. The expansion bolt assembly of claim 11, wherein the elastic component is configured to be disposed into holes of first and second objects, the lower parts of the ribs are configured to engage a lower portion of the hole in the first object, and the petal-shaped sheets are configured to engage an upper surface of the second object.

13. The expansion bolt assembly of claim 9, wherein the nut has a tapered end, and the lower opening is configured to receive the tapered end of the nut.

14. The expansion bolt assembly of claim 9, wherein the elastic component is configured to be received into a hole of an object, the lower parts of the ribs are configured to move radially outward to engage an interior surface of the hole in the object, and the upper parts of the ribs are configured to move radially inward to engage a necking part of the bolt.

* * * * *